United States Patent [19]

Gibellini

[11] Patent Number: 4,942,963
[45] Date of Patent: Jul. 24, 1990

[54] CONTAINER FOR STORAGE BATTERIES

[75] Inventor: Folco Gibellini, Carate Brianza, Italy

[73] Assignee: Aies Gibellini S.p.A., Milan, Italy

[21] Appl. No.: 228,115

[22] Filed: Aug. 4, 1988

[51] Int. Cl.⁵ .......................................... B65D 85/30
[52] U.S. Cl. ................................. 206/333; 206/523
[58] Field of Search ............................... 206/333, 523

[56] References Cited

U.S. PATENT DOCUMENTS

| | | | |
|---|---|---|---|
| 2,592,081 | 4/1952 | Toulmin | 206/523 |
| 3,692,901 | 8/1969 | Hagen | 206/523 |
| 3,768,724 | 10/1973 | Hill | 206/523 |
| 3,948,436 | 4/1976 | Bambara | 206/523 |
| 3,980,178 | 9/1976 | Schidlowski | 206/523 |
| 4,087,002 | 5/1978 | Bambara et al. | 206/523 |
| 4,209,091 | 6/1980 | Lieberman | 206/523 |
| 4,251,006 | 2/1981 | Smith | 206/523 |
| 4,620,633 | 11/1986 | Lookholder | 206/523 |

FOREIGN PATENT DOCUMENTS 0644902  7/1962  Canada ............................. 206/523

*Primary Examiner*—Paul T. Sewell
*Attorney, Agent, or Firm*—Shlesinger Fitzsimmons Shlesinger

[57] ABSTRACT

An improved container for electric storage batteries is embodied as a single piece of plastic material having a structure consisting of a relatively thin outer coat of said material, which is compact and of high density, and of a larger-thickness inner core made of the same material but of density appreciably lower than that of the outer coat.

5 Claims, 1 Drawing Sheet

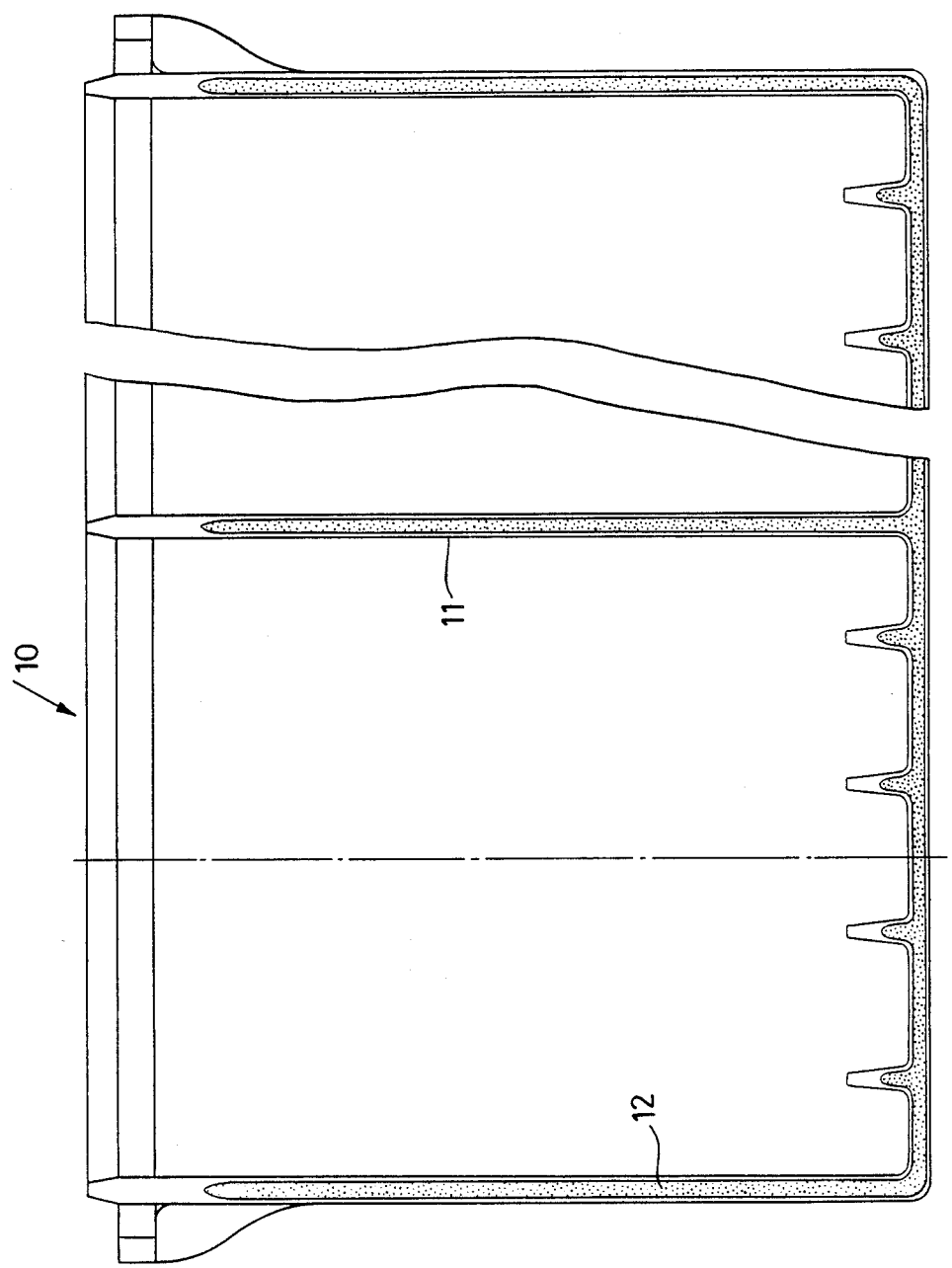

CONTAINER FOR STORAGE BATTERIES

The present invention relates to a container for electric storage batteries, having a particularly advantageous structure constructed from differentiated density plastic material.

The use of vulcanite (ebonite) for making containers for electric storage batteries, especially large containers, is known; this low-cost material combines excellent acid-resistant properties with practically nil electrical conductivity, these being essential requisites for an electric storage battery container.

Vulcanite is, however, a very brittle material so that large containers of the type in question, for example those for trucks, earth-moving machines, lift trucks, railway coaches and tractors have to be made with relatively thick walls, which means that they are heavy and bulky.

In addition the housing for such storage batteries provided on the vehicles must ensure that the severe stresses to which the vehicles are subjected while in operation are not transmitted to the storage batteries.

Storage battery containers made of plastic material, generally polypropylene, are also known, but their use is generally confined to small storage batteries since, if they are to assure the required structural rigidity, large containers would have to have complex reinforced sections which would increase their cost prohibitively.

The object of the present invention is to embody a container for storage batteries which, though of very lightweight structure, will satisfy the aforesaid requirements.

To attain such object, the invention embodies an improved container for electric storage batteries characterized in that it is embodied in a single piece of plastic material the structure of which is as follows: a relatively thin coat made of the said material, which is compact and has elevated density, and an inner core made of the same material but having a density lower than that of the outer coat.

According to a preferred form of embodiment of the invention, the outer coat has a thickness varying from 1 to 2.5 mm and the inner core an average thickness of about 4 mm. The density of the inner core can be up to 20% lower than that of the outer coat.

The structural and functional characteristics of the invention, and its advantages over the known art, will become more apparent from an examination of the following description, referred to the appended single drawing, which shows in sectional view an example of a container embodied according to the innovative principles of the invention.

With reference to the appended drawing, the container in question is indicated overall by 10, and typically has a monolithic structure comprising a compact outer coat 11 made of a high-density thermoplastic material and an inner core 12 made of the same but lower-density material.

For the purposes of the invention a propylene copolymer coded EPC 40 R manufactured by HIMONT has shown itself to be particularly advantageous, but others can also be used such as for example ABS (acrylonitrile butadiene styrene).

The material mentioned has high flowability, excellent impact strength also at low temperatures, elevated rigidity, Shore "D" surface hardness of approximately 70, and lends itself very well indeed to forming in hydraulic injection presses.

The chemical resistance of the copolymer in question has been tested against the majority of inorganic and organic chemical reagents with excellent results, even at temperatures at which the more common thermoplastic materials can no longer be effectively used. In addition the said copolymer is resistant to practically all mineral alkalies, and acids, including very strong acids and alkalies, and at temperature higher than 60°C. With use of this copolymer it is possible to obtain a storage battery container in which the outer coat il can preferably have a thickness variable between 1 and 2.5 mm, with a density close to that of the compact material, while the inner core 12 can have an average thickness in the region of 4 mm and a density that can be up to 20% lower than that of the outer coat 11. As stated heretofore, the outer coat 11 and the inner core 12 are made of the same material, the inner core 12 being treated with blowing agents which decompose by the effect of temperature and cause the formation of closed cells in the mass of the material.

The Table that follows, reports the result of a series of comparative tests perfomed on a conventional vulcanite container, a conventional thin-walled polypropylene container and a container embodied in accordance with the invention using a differentiated density thermoplastic material.

As can be seen from the Table, the container of the invention, compared both to the vulcanite and polypropylene containers, has immensely greater impact strength, at room temperature and at −35°C., and is therefore suitable for use with ample safety margins not only at all latitudes but also in the most exacting operating conditions. Table follow:

TABLE

PHYSICAL PROPERTIES OF MATERIALS USED FOR PRODUCING STORAGE BATTERY CONTAINERS

| TEST | TEST METHOD | UNIT OF MEASUREMENT | MATERIALS VULCANITE Av. thickness 7 mm |
|---|---|---|---|
| (1) TENSILE STRENGTH | ASTM D638 | Kg./cm$^2$ | 57 + 60 |
| (2) ELONGATION AT BREAK | ASTM D638 | % | 3.5 + 4.5 |
| (3) SURFACE HARDNESS | | SHORE D | 55 + 60 |
| (4) RESISTANCE TO SULPHURIC ACID AT DENSITY 1.27 ± 0.005 TEST TEMPERATURE 70 ± 2° C.-168 h | ASTM D543 | % | WT. VAR. 0.9 VOL. VAR. 1.01 |
| (5) IMPACT STRENGTH (FALLING BALL WT. 0.885 Kg) | PRACTICAL | H min.mm. | +23° C. 100 −35° C. 45 |
| (6) DIELECTRIC STRENGTH 30 KV FOR 5 sec. | PRACTICAL | | POSITIVE |
| (7) DISTORTION WITH H$_2$O AT 75° C. FOR 24 h | PRACTICAL | mm. | 0.3 |
| (8) SPECIFIC GRAVITY AT 23° C. | ASTM D792 | | 1.27 |

TABLE-continued
PHYSICAL PROPERTIES OF MATERIALS USED FOR PRODUCING STORAGE BATTERY CONTAINERS

| TEST | TEST METHOD | UNIT OF MEASUREMENT | MATERIALS POLYPROPYLENE Av. thickness 3 mm |
|---|---|---|---|
| (1) TENSILE STRENGTH | ASTM D638 | Kg./cm$^2$ | 260 + 270 |
| (2) ELONGATION AT BREAK | ASTM D638 | % | 250 + 300 |
| (3) SURFACE HARDNESS |  | SHORE D | 65 + 68 |
| (4) RESISTANCE TO SULPHURIC ACID AT DENSITY 1.27 ± 0.005 TEST TEMPERATURE 70 ± 2° C.-168 h | ASTM D543 | % | 0.5 0.6 |
| (5) IMPACT STRENGTH (FALLING BALL WT. 0.885 Kg) | PRACTICAL | H min.mm. | 1200 800 |
| (6) DIELECTRIC STRENGTH 30 KV FOR 5 sec. | PRACTICAL |  | POSITIVE |
| (7) DISTORTION WITH H$_2$O AT 75° C. FOR 24 h | PRACTICAL | mm. | 12 |
| (8) SPECIFIC GRAVITY AT 23° C. | ASTM D792 |  | 0.9 + 0.92 |

| TEST | TEST METHOD | UNIT OF MEASUREMENT | MATERIALS 2-COMPONENT Av. thickness 6 mm |
|---|---|---|---|
| (1) TENSILE STRENGTH | ASTM D638 | Kg./cm$^2$ | 210 + 220 |
| (2) ELONGATION AT BREAK | ASTM D638 | % | TEST NOT VALID - SEMI-EXPANDED STRUCTURAL MATERIAL |
| (3) SURFACE HARDNESS |  | SHORE D | 65 + 68 |
| (4) RESISTANCE TO SULPHURIC ACID AT DENSITY 1.27 ± 0.005 TEST TEMPERATURE 70 ± 2° C.-168 h | ASTM D543 | % | 0.6 0.7 |
| (5) IMPACT STRENGTH (FALLING BALL WT. 0.885 Kg) | PRACTICAL | H min.mm. | 2000 1800 |
| (6) DIELECTRIC STRENGTH 30 KV FOR 5 sec. | PRACTICAL |  | POSITIVE |
| (7) DISTORTION WITH H$_2$O AT 75° C. FOR 24 h | PRACTICAL | mm. | 2.5 |
| (8) SPECIFIC GRAVITY AT 23° C. | ASTM D792 |  | 0.82 + 0.85 |

The remarkably high impact strength and the lower specific gravity are properties that are advantageous compared to vulcanite, and this advantage can be exploited not only for storage batteries for heavy vehicles for industrial road transportation and for earth-moving operations but also for storage batteries for vehichles operating inside production departments, as also for automated and manual materials handling along production lines.

Additionally, the container according to the invention has notable dimensional rigidity.

Another important characteristic of a container embodied according to the invention is its versatility, in as much as it can be assembled both with single covers — by mastication with resins or bitumen — and with an all—in cover by heat-sealing.

It is so obtained the object mentioned in the forward of the specification.

I claim:

1. An improved, substantially rigid, high impact strength container for electric storage batteries, characterized in that the container is embodied as a single piece of plastic material having a structure consisting of a relatively thin, rigid outer coat of said material, which is compact and of relatively high density, and a thicker inner core enclosed in said outer coat and being made of the same material as said outer coat but having a density appreciably lower than that of the material forming said outer coat, and wherein the said outer coat has a thickness in the range of from 1 to 2.5 mm, and said inner core has an average thickness of approximately 4 mm, the density of the inner core being up to 20% lower than that of the outer coat.

2. A container as described in claim 1, wherein said plastic material is a copolymer of propylene.

3. A container described in claim 1, wherein the said plastic material ABS.

4. A container as described in claim 1, wherein said material forming said inner core includes a blowing agent operatively forming a mass of closed cells in said core.

5. A container as defined in claim 1 wherein said outer coat has a Shore D Surface hardness of approximately 70.

* * * * *